March 2, 1965   H. P. YULE   3,171,961
NUCLEAR RESONANCE FLUORESCENCE LOGGING
Filed Dec. 30, 1960   4 Sheets-Sheet 2

INVENTOR
HERBERT P. YULE
BY
ATTORNEYS

March 2, 1965 H. P. YULE 3,171,961
NUCLEAR RESONANCE FLUORESCENCE LOGGING
Filed Dec. 30, 1960 4 Sheets-Sheet 3

INVENTOR
HERBERT P. YULE
BY
ATTORNEYS

FIG. 6

United States Patent Office 3,171,961
Patented Mar. 2, 1965

3,171,961
NUCLEAR RESONANCE FLUORESCENCE LOGGING
Herbert P. Yule, Laguna Beach, Calif., assignor to California Research Corporation, San Francisco, Calif., a corporation of Delaware
Filed Dec. 30, 1960, Ser. No. 79,714
8 Claims. (Cl. 250—83.3)

The present invention relates to a method of well logging by nuclear resonance fluorescence, and more particularly to the identification of only particular nuclei, such as carbon or oxygen, in an earth formation traversed by a well bore by detecting the resonant-fluorescent gamma rays that are emitted solely by such nuclei when excited to a resonant energy level characteristic of only such particular nuclei.

It is a particular object of the invention to identify only carbon, or oxygen, in an earth formation traversed by a well bore by exciting nuclei of one or the other of these elements in said formation to a level that permits those same nuclei to undergo nuclear resonant fluorescent scattering of gamma ways that is characteristic of these elements alone. In carrying out this object, a target of material whose nuclei are capable of conversion to a known, resonantly excited state of carbon (or oxygen) nuclei is positioned in the well bore and so arranged that nuclei in the target may be irradiated or bombarded with elementary nuclear particles. The selected elementary nuclear particle for irradiation of the target is accelerated to a known energy that is selected to impart (1) the exact energy required to create said desired, excited nucleus in the target, (2) the resulting kinetic energy of said excited nucleus, (3) the angle of emission of a gamma ray from said excited nucleus at its characteristic resonant energy for nuclei like that nucleus to be detected in an earth formation and (4) the recoil energy loss of said characteristic gamma ray, when it interacts with said like nucleus of the same element in the formation. When the irradiating particles are so energized, only the selected nucleus, either carbon or oxygen, within the earth formation will be excited by gamma rays at the resonant energy. The emitted or fluorescent gamma rays from said formation nuclei are characteristic of the desired nucleus, and no other nuclei within the formation. Accordingly, any gamma rays above a predetermined minimum energy returning to the well bore can only be those from the desired nucleus. If desired, a few nuclei other than carbon-12 or oxygen-16, those primarily useful in petroleum well logging, can be excited in a similar manner.

In the logging of wells drilled for petroleum, it has long been desired to have a direct indication of the presence of either oil or water in the earth formations penetrated by the borehole. Such indication is desired not only when the well is first drilled, but also after it has been lined, or cased, with steel pipe. Many methods have been suggested, including electrical resistivity and self-potential measurements as well as various forms of electromagnetic and particle radiation. However, use of each of these known methods generally results in only another indirect method of indicating the presence of petroleum or water, because such measurements cannot exclude the rock of the formation, or the steel in the pipe. None has been truly definitive under a variety of different geologic and borehole conditions.

Recently it has been proposed to identify carbon and oxygen as constituents of either petroleum or water in an earth formation by identifying gamma rays emitted by these nuclei upon inelastic scattering of fast neutrons. Such a method has been successful in some instances, but the obtained reactions can be confused with other reactions that occur at the same time and with about the same energy, and with even greater probability than those involving carbon or oxygen. The relative probability for inelastic scatter of fast neutrons by carbon and oxygen to emit gamma rays is low, and such gamma rays must be identified in the midst of other gamma rays of similar energy produced with greater probability by other nuclei in the earth formation when irradiated by neutrons. Even when an attempt is made to separate the interactions in the earth formation between those due to inelastic scattering of fast neutrons and thermal neutron-capture, it is difficult to distinguish gamma rays that are characteristic of carbon and oxygen, due to the large number of gamma rays of the same or higher energy being produced at the same time by thermal neutrons.

One reason for much confusion arises from the fact that fast neutrons slow down to epithermal and thermal energies where they interact with other, more abundant nuclei by different processes.

For the foregoing reasons, there has long been a need for a direct and unambiguous detection system for identifying either carbon or oxygen without confusion by such other and more probable gamma ray reactions.

In accordance with the present invention, it is a primary object to provide a system that identifies solely characteristic gamma rays from carbon, or oxygen, without confusion by other gamma rays.

Because of the complex nature and origin of the particular gamma rays which will be characteristic of only carbon and oxygen by the present invention, there is now presented a general explanation of the nuclear resonance fluorescence process. Following the general explanation is a description of several ways to produce the resonant radiation, and the manner in which the radiation can be used to locate carbon and/or oxygen in an earth formation.

A rough idea of nuclear resonance fluorescence may be gained by analogy with atomic fluorescence. When a continuous spectrum of light falls on a collection of atoms some of the light will be absorbed and re-emitted. The criterion for absorption is that the energy of the quantum of light, or photon, must be equal to the difference in energies of the lowest energy state of the atom and a higher energy state. These states are referred to as ground and excited states, respectively. After absorption, the excited atom may re-emit a quantum of energy equal to the difference in energies of the excited and ground states, and thus the energy of the emitted photon is equal to the energy of the incident photon. The emitted photon may be emitted in any direction with respect to the direction of the incident photon. Nuclear fluorescence is similar to optical fluorescence, but instead of being absorbed and re-emitted by atoms, the photons are absorbed and re-emitted by the nuclei.

Now let us first examine the differences between atomic fluorescence and nuclear fluorescence. In nuclear fluorescence, the energies of the incident quanta are much higher than the visible light of optical fluorescence. For optical fluorescence, photon wave lengths are in the range 3500–8000 Angstrom units, corresponding to energies of 3.54 and 1.55 electron volts (e.v.), respectively. In nuclear fluorescence the photons are called gamma rays, and have energies in the order of millions of electron volts (m.e.v.). Thus, in nuclear fluorescence, the energies of excited nuclear states are in the m.e.v. range, instead of the e.v. range. In addition, the width (range of energies) of most nuclear levels is extremely small compared to the height of the level. For example, the first excited state of carbon-12 is at 4.433 m.e.v. while the width of this state, or level, is 0.00000002 m.e.v. (.02 e.v.) or less. The significance of these numbers is that while the exact position of the energy level is not known with great precision past the third decimal place, the width of the level is established as only ± 0.00000002 m.e.v. Hence, the energy necessary to excite carbon-12 to its first excited state must fall within ±0.00000002 m.e.v. of the position of the level which is 4.433 m.e.v. Obviously, only gamma rays within ± 0.00000002 m.e.v. of the correct energy can excite a carbon-12 nucleus to its first excited state. In general, only a very narrow range of gamma ray energies can excite nuclei; the actual gamma ray energies and energy ranges, of course, depend on the nucleus under consideration.

Another difference between the two kinds of fluorescence (atomic and nuclear) is that the absorbed and emitted gamma rays are of slightly different energy. Consider a nucleus in its first excited state which de-excites to its ground state by emitting a gamma ray. Due to the law of conservation of momentum, the nucleus recoils with a momentum just equal to the gamma ray momentum. This process is analogous to the recoil of a pistol from the firing of a bullet. The energy of the recoiling nucleus is small compared to the energy of the gamma ray, and is equal to $E^2/2Mc^2$ where E is the gamma ray energy, M is the mass of the nucleus, and $c$ is the velocity of light. The law of conservation of energy requires that the excitation energy of the first excited state, $E^*$, be equal to the sum of the gamma ray and recoil energies. In the case of carbon-12, the recoil energy of the nucleus due to a gamma ray produced by de-excitation of the 4.433 m.e.v. level is 0.000877 m.e.v. or 877 e.v. Consider now what happens when a nucleus absorbs a gamma ray and is excited from its ground state to its first excited state. Again the law of momentum comes into play, this time requiring the excited nucleus to move with a momentum just equal to that of the incoming gamma ray. The kinetic energy of the recoiling nucleus is again given by $E^2/2Mc^2$. It may be seen, then, that the re-emitted gamma ray is lower in energy than the incident gamma ray by twice the recoil energy of the nucleus, a total energy loss of $E^2/Mc^2$. The width of the nuclear level is much smaller than $E/Mc^2$, and it is important to note that the re-emitted gamma ray no longer has sufficient energy to excite another nucleus of the same species from which it has just been emitted. The change in energy of the gamma ray is analogous to the Doppler shift which occurs with moving sources of sound, and is also known as a Doppler shift.

From the foregoing discussion, it may be seen that in order for a gamma ray to excite a nucleus to its first excited state, the gamma ray must contain, first, energy equal to the difference between the first excited state and ground state of the nucleus. This quantity is written as $E^*$. Second, it must contain sufficient energy to take care of the Doppler shift. Thus, the gamma ray energy, E, is the sum of these two quantities, or written mathematically $E=E^*+E^2/Mc^2$.

At this point, it is necessary to discuss how gamma rays of energy E are obtained. A collection of nuclei in their first excited states is not a suitable source for exciting other nuclei of the same type, since the energy of the emitted gamma rays is $E^*-E^2/2Mc^2$. Since the width of the level is much smaller than the recoil energy, the emitted gamma rays are of insufficient energy to excite other nuclei of the same type. However, if the emitting nucleus is moving, the energy of the gamma ray may be increased or decreased according to the direction of emission with respect to the motion of the nucleus. Such motion may be imparted to the nucleus in several ways, as discussed below. Thus, it is possible to create a moving nucleus that will emit a gamma ray at an angle less than 90° with respect to the direction of motion of the nucleus (0°). If this energy is $E+E^2/Mc^2$, the emitted gamma ray can undergo nuclear resonance fluorescence with a second nucleus of the same type as the emitting nucleus. In generating a gamma ray of this exact energy, the speed of the emitting nucleus determines this angle of emission. The second nucleus can emit the fluorescent gamma ray without moving prior to the emission. Unless a special effort is made to move the nucleus, the resultant gamma-ray energy is $E-E^2/2Mc^2$. Hence, with a moving nucleus as a resonant gamma-ray source, nuclear resonance fluorescence gamma rays can be detected in a stationary scatterer of the same nuclear composition.

The motion of the nuclei may be achieved in a number of ways: (1) recoil from nuclei previously made radioactive and then undergoing decay, (2) thermal motion, (3) mechanical motion, (4) nuclear transformation reactions, and (5) nuclear inelastic scattering. In addition, a source of "white" (wide energy range) gamma rays may also be employed using an electron accelerator to generate high-energy electrons which may be diverted onto a target to yield Bremsstrahlung. The first three methods produce nuclei in their first excited state through radioactive decay.

In the first method of radioactive nucleus is the source and emits an electron (or, alternatively, captures an orbital electron) that leaves the residual nucleus in an excited state above its first excited state. Thus, the nucleus may de-excite from this higher level (second or greater) by sequential emission of gamma rays to its first state and then the ground state; the first transition can supply a sufficiently large velocity to the nucleus to give the desired, and resonant, gamma ray the required energy. Obviously, this method is limited by the characteristics of the radioactive nuclei which give rise to the moving source nuclei, for the energy of recoil must be provided by the initial radiative step in the decay; the half life of the radioactive nuclei must be long enough so that the reaction can be completed before the radioactive nuclei have all decayed, and the decay must leave the residual nucleus in its required excited state, and the lifetime of this immediately preceding state must be $3\times10^{-13}$ seconds or less.

In the second method, heating of a radioactivity source can cause thermal motion of the nuclei that is energetic enough to make up the loss. In the third method, mechanical motion, such as locating the radioactivity source on the periphery of a rapidly spinning wheel, can also accomplish this goal. The three methods employing a stationary radioactive nuclei, thermal motion, and mechanical motion are limited experimentally to energies, E, less than 500 k.e.v., and to nuclei of relatively high Z. In these cases the half life of the radioactive parent nucleus must be appropriate, and the decay must go, in a reasonable fraction of the total number of transitions to the required excited state. It is optional whether the decay leads directly to the first excited state as in the case of carbon or through a higher excited state, such as the third, in case of oxygen.

Nuclear reactions may be used to impart motion to individual nuclei within a stationary source. There is a limitation on this method, for if the moving nuclei come to rest before they emit the resonant gamma rays, then the Doppler shift in energy is lost and the nuclear resonance fluorescence process is no longer feasible. For solid sources, the de-excitation of the moving nuclei should occur in less than about $3\times10^{-13}$ seconds, which is the slowing down time for nucei in solids. For a solid source, nuclear resonance fluorescence is not observed unless the lifetime of the excited nuclear state is less than about $10^{-12}$ to $10^{-13}$ seconds. In liquid and gaseous sources the collision times are longer, and hence, it is possible to observe nucelar resonance fluorescence in nuclei in which the lifetime is somewhat longer.

Nuclear reactions of the type $A(b,c)D^*$ may be used to supply the needed energy increment. Here A is the target nucleus which is not radioactive, $b$ is a bombarding nucleon from an accelerator or other source of fast nucleons, $c$ and $D^*$ are the products of the reaction, and D* is the sought nucleus. The asterisk indicates that D is in its first excited state. D may represent a different nucleus, or the original nucleus A in its first excited state. Consider first the case in which the reaction is exoergic. Suppose we have a collimated beam of particles $b$ striking a target of A nuclei. Motion of the residual excited nucleus, D*, comes from two different causes. Conservation of momentum demands that $c$ and D* have momentum components in the direction of $b$. In other words, the motion of $b$ results in motion of the reaction products in the same direction as that of $b$, and the products' momentum components in that direction must be equal to the original momentum of $b$. The other cause of motion is the recoil of D* when $c$ is ejected. Particle $c$ may be ejected in any direction, and since the recoil of D* must be equal in momentum and opposite in direction, D* may move in any direction. The momentum given D* may be larger than that contributed by the motion of $b$. At some angle with respect to the motion of D*, a resonant gamma ray may be emitted. The net result of all this is that resonant gamma rays may be emitted in all directions, with respect to the incident beam of $b$'s, although the angular distribution of resonant radiation may or may not be isotropic depending on the particular nuclear reaction.

Turning now to endoergic reactions, there are two classes which may be considered. Reactions for which $b$ and $c$ are different and hence A and D are different offer few advantages over the exoergic reactions discussed in the preceding paragraph; hence, they are not considered here. However, inelastic scattering, in which $b$ and $c$ are the same and A and D are the same, are of particular interest. This class of reaction is known as inelastic scattering, and is written $A(b,b')A^*$. The incident particle $b$ has much more energy than the scattered particle $b'$, and A is left in its first excited state. Here the Doppler shift is again obtained, but since the reaction is endoergic there is only a minor contribution from the recoil of A*. Observing the resultant gamma rays at zero degrees, we see the transition energy plus the full Doppler shift, at 90° just the transition energy, and at 180° the transition energy minus the full Doppler shift. It is clear that the resonant gamma rays of desired energy are found at a particular angle between zero and 90°. However, the observable angle of emission of resonance radiation is spread out by the recoil of A*, but as long as the energy of $b$ is within one m.e.v. of the threshold for inelastic scattering, the spread varies the emission angle by only a few degrees. Hence, resonant gamma rays are found at the given angle, plus or minus a few degrees. These resonant gamma rays can in turn cause fluorescence when used to irradiate target nuclei that are of the same mass as A*.

It is clear then from the foregoing discussion that this is a resonance process, that the radiation that can be absorbed and re-emitted is called resonance radiation, and that the process is known as nucelar resonance fluorescence.

For a better understanding of the distinction between the generation and detection of nuclear resonance fluoresence that is characteristic solely of known nuclei in an earth formation, reference is now made to the drawings which form an integral part of the present specification.

In the drawings:

FIG. 7 illustrates the nuclear resonance fluorescence distribution of gamma rays from carbon-12 in a similar diagram of intensity versus energy, when an earth formation of the same composition as that used to produce FIG. 5 is subjected to gamma radiation of the prescribed quantum and kinetic energy, and indicates the unambiguous identification of carbon-12 in said formation when so irradiated.

Figures 1, 2A, 2B:
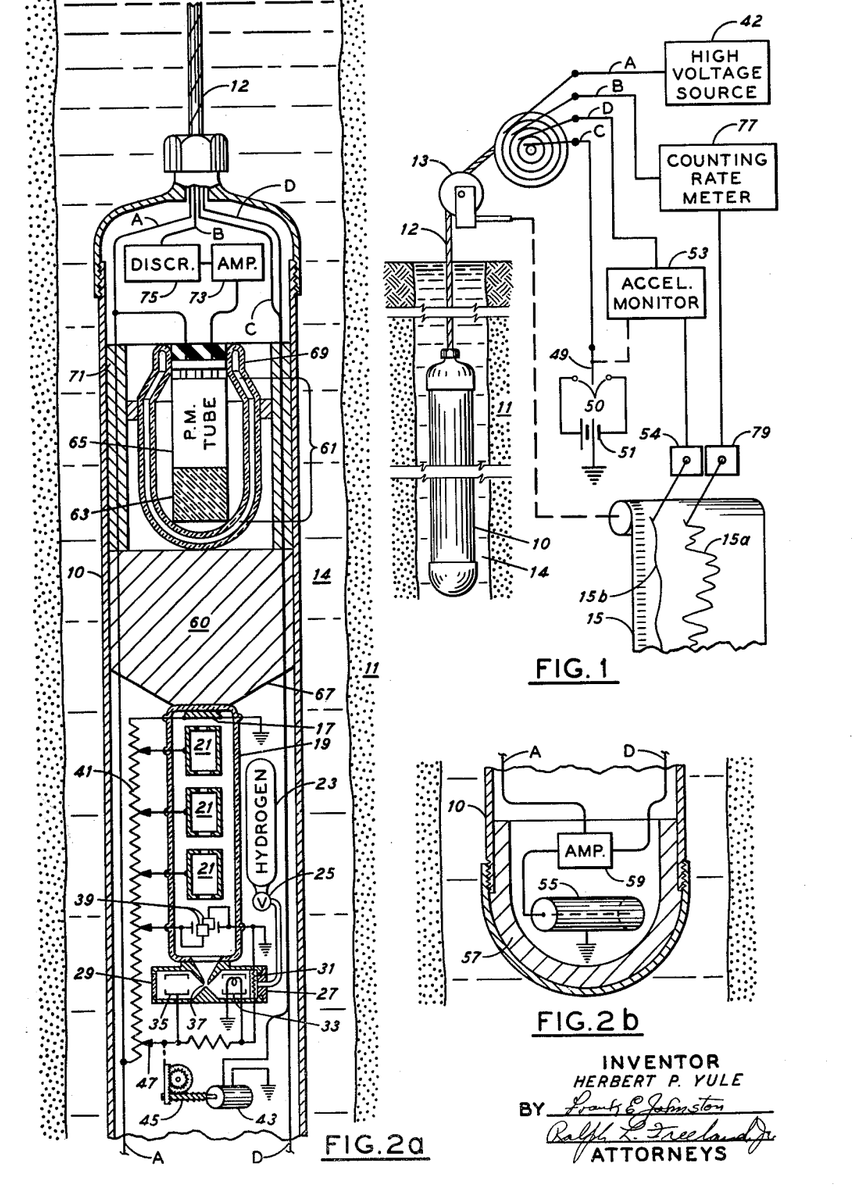
FIG. 1 is a schematic representation of a logging system adapted to perform nuclear resonance fluorescence logging that includes recording and monitoring apparatus at the earth's surface.
FIG. 2A is an enlarged cross-sectional view of the upper portion of a logging sonde useful in the arrangement of FIG. 1, which includes a linear accelerator and the principal detecting apparatus.
FIG. 2B is the lower extension of the sonde in FIG. 2A which includes the accelerator output monitoring arrangement.

Referring now to the drawings, and in particular to FIGS. 1, 2A and 2B, there is illustrated a preferred form of apparatus for carrying out the present method of unequivocally identifying the presence of an unknown element, such as carbon or oxygen, in an earth formation by nuclear resonance fluorescence. As indicated in FIG. 1, a logging sonde 10 is suspended in a well bore 11 by cable 12. As is conventional in well logging apparatus, the depth of logging sonde 10 in well bore 11 is correlated with a record 15 on which the intensity of nuclear resonance fluorescent gamma rays from carbon or oxygen is displayed as curve 15A. Cable 12 drives mechanical link 13 to position record 15 in accordance with the actual depth of sonde 10 in well bore 11.

In order to generate gamma rays by nuclear resonance fluorescence in nuclei within the earth formation, it is necessary that there be a source of gamma rays of known energy. To create resonant radiation from the first excited state of carbon-12, for example, it is essential that the irradiating gamma rays be generated in nuclei which are, or can be converted to, carbon-12 in its first excited state, and whose half-life in said excited state is sufficiently short, approximately $10^{-12}$ to $10^{-13}$ seconds, to emit the desired nuclear resonant radiation. In the embodiment of FIGS. 2A and 2B, there is illustrated in logging sonde 10 a target 17 which, for purposes of the present illustrative embodiment, is considered to be essentially carbon-12. With a target containing carbon-12 nuclei it is possible to excite that nucleus to its first excited state by the $C^{12}(p,p')C^{12*}$ reaction. In FIG. 2A linear accelerator 19 accelerates a beam of protons so that they will travel substantially parallel to the axis of the well bore and strike target 17 with the required energy. To create the excited state of carbon-12, they must strike the nucleus with an energy of 4.43 m.e.v. plus sufficient kinetic energy to scatter them in a forward direction. In this way, the resulting 4.43 m.e.v. gamma rays have an initial momentum of just the right energy to compensate for the Doppler shift. This Doppler shift energy is $E^2/Mc^2$, and numerically, with a gamma ray of 4.43 m.e.v., is 877 e.v. As mentioned above, this reaction is an endoergic reaction and is written as $A(b,b')A^*$.

For an explanation of how such protons are given the correct energy to create this reaction, reference is now made to the construction of linear accelerator 19. Since protons are the nucleus of $H^1$, the protons may be supplied by hydrogen in the form of a gas. Bottle 23 holds hydrogen gas that is controllably admitted to accelerator 19 through valve 25 and a palladium leak 27 formed in the ion injector chamber, or proton generator, 29. In the present example palladium leak 27 is a porous metal that will pass hydrogen into chamber 29 when warmed by heater 31 to a prescribed temperature. Injector chamber 29 also includes an electron source, such as cathode 33 and an electron collector, plate 35. When cathode 33 and plates 35 are excited with respect to each other protonic ions are created by electron bombardment of the neutral-hydrogen molecules. Such molecules are broken into ions that can be stripped of their electrons to form positive ions, or protons. Such charged protons are then extracted through the restriction, or gap, 37, focused by means of deflection plates 39, and then accelerated linearly along the length of accelerator 19 by drift tubes 21. Control of the energy of the proton beam is achieved through the potential applied to proton injector plate 35 and the total potential available along accelerator 19 for impacting the particles against target 17. The variable potentials applicable to accelerator 19 are indicated schematically by the variable taps on potentiometer 41. High voltage is supplied from the earth surface to sonde 10 by source 42 and line A of cable 12. Alternatively, a down hole source, not shown, can also be used to provide the necessary potential to operate accelerator 19.

Schematically, control of the potential at injector 29 is indicated as being through an electric motor 43 that includes reduction gearing mechanism 45 to operate slide wire tap 47 on potentiometer 41. Control of motor 43 is through line C and the two position switch 49 that selectively connects line C to one side or the other of battery 51 through the switch contacts 50. As also indicated by the dashed line in FIG. 1, switch 49 may be automatically controlled through an accelerator monitor, indicated as 53. Monitor 53 is controlled through line D which in turn is connected to a monitoring radiation detector 55 located in the bottom of logging sonde 10, as indicated in FIG. 2B. The output of monitor 53 is desirably recorded on record 15 as curve 15B by oscillograph unit 54.

The purpose of monitor detector 55, which may be an ionization chamber, is to determine the number of gamma rays generated in target 17. This number is directly proportional to the number of nuclear resonance gamma rays available to irradiate nuclei in the earth formation surrounding the well bore. Shield 57 surrounds detector 55 to exclude from it low energy gamma rays that scatter in both the earth formation and the well bore fluids. Additionally, shield 57 is long enough so that substantially all gamma rays entering detector 55 are directly emitted by target 17 and travel vertically downwardly to the detector through accelerator 19 and the intervening space. The threshold for amplifier 59 is set so that only those gamma rays that are about the correct energy to produce nuclear resonance fluorescence in the earth formation are detected and counted at the accelerator monitor 53 on the earth's surface and recorded as curve 15B. Also to assure that the energy of the gamma rays generated at target 17 is correct to create nuclear resonance fluorescence gamma rays in the earth formation, the optimum angle for gamma rays passed to the earth formation 11 is closely controlled. This angle is substantially 90°, with the angle of incidence of the protons on target 17 being taken as 0 degree. In the present embodiment shield 60 helps to define this angle. It also prevents gamma rays from target 17 passing directly through the logging sonde to the scintillation detector 61 comprising scintillation crystal 63 and photomultiplier tubes 65. Shield 60 also includes an upwardly tapered portion, identified as 67, that is about 15° less than the 90° angle that would make gamma rays leave target 17 normal to the well bore 14 and the earth formation 11. While this angled face 67 can be varied somewhat from 15° forward of normal, it is desirable to maintain this angle within about 30° to converge the nuclear resonant radiation beam into a cone shape around said 90° angle, or normal, to the well bore and earth formation.

Shields 60 and 57 may both be made of bismuth which has a relatively high absorption coefficient for gamma rays. It may also be made of cadmium or lead, since no other interfering radiation is generated in the process of nuclear resonance fluorescence.

Because of the simplicity of the nuclear resonance fluorescence gamma ray spectra that are generated by detector 61 upon irradiation of carbon-12 by gamma rays containing kinetic energy and the first-excited state energy from carbon-12, the detection system may be relatively simple, and as indicated above, comprises only the scintillation detector 61 which includes crystal 63 and photomultiplier tubes 65. Detector 61 is housed within a Dewar flask 69 to maintain the temperature of photomultiplier tube 65 below a desired thermal noise level. As discussed above, low energy gamma rays resulting from multiple Compton scattering of the 4.43 m.e.v. gamma rays do not interact by nuclear resonance fluorescence with carbon-12 and hence can be readily excluded from the recorded spectra. Accordingly, a relatively heavy walled shield 71 may surround the detector. Because of the characteristic degradation of 4.43 gamma rays that do not interact by nuclear resonance fluorescence with carbon-12, it is possible to detect solely the interaction with carbon by measuring all gamma rays above about 3 m.e.v. energy. Gamma rays below said energy can be assumed to have been by Compton scatter process which includes interaction of such gamma rays with electrons within the surrounding media. In addition to the shield 71, this energy may be measured by a proper setting of discriminator 75 which is coupled through amplifier 73 to photomultiplier tube 65.

Because, as mentioned above, the nuclear resonance fluorescence gamma rays are characteristic of only carbon-12 in the present embodiment, discriminator 75 is set to record only gamma rays of about 3 m.e.v. Accordingly, the surface recording system may be reduced to a simple counting rate meter 77 which records only the counts per unit time detected by scintillation detector 61. The output of counting rate meter 77 is of course applied to an oscillographic recording element 79 to record curve 15A directly on chart 15. The relative number of gamma rays recorded are solely characteristic of carbon-12 in the earth formation.

From the foregoing detailed description of the embodiments shown in FIGS. 1, 2A and 2B, it will now become apparent that the same apparatus may be used to perform the method of nuclear resonance fluorescence well logging in which other elements are detected in addition to, or alternatively to, carbon-12. For example, if the target 17 is converted to a carbon and oxygen containing material, such as a capsule of liquefied carbon dioxide, it is then possible to alternately, or successively, convert the oxygen nuclei to an excited state of oxygen-16 by a similar nucleon, inelastic scatter process of the same type indicated above; namely, the endoergic reaction $A(b,b')A^*$. In such reaction A is oxygen-16, and to create the reaction it will of course be necessary to change the irradiating energy of the proton to excite oxygen-16 to the 6.91 or 7.12 m.e.v. level. These levels are respectively the second and third excited states of oxygen-16, but the nucleus emits both of the gamma rays at the characteristic energies in returning to its ground state, and the half-life of such an excited nucleus is less than $3 \times 10^{-13}$ seconds. It will be apparent that a simple program to energize the linear accelerator and the detection device may be used to alternately record the carbon-12 and the oxygen-16 intensities by nuclear resonance fluorescence gamma rays.

The same results may also be obtained if the target rather than containing oxygen-16 and carbon-12 is formed of fluorine-19 and nitrogen-15. Both of these materials may be made to react by the proton-alpha reaction in which the exoergic reactions $A(b,c)D^*$ are respectively known by the reaction $F^{19}(p,\alpha)O^{16*}$ and $N^{15}(p,\alpha)C^{12*}$. As indicated by the above notations, the protons incident upon the target 17 interact with the nonradioactive isotopes, either fluorine-19 or nitrogen-15, and impart to those nuclei the necessary kinetic energy. At the same time, a new nucleus is created by the emission of an alpha particle (2 protons and 2 neutrons). The new radioactive nucleus at its first excited state is oxygen-16, and carbon-12, respectively.

Other reactions that may also be used to create the excited state of either carbon-12 or oxygen-16 involve the inelastic scattering of alpha particles or neutrons by the O-16 or C-12 nucleus to create the excited states. Such alpha particles are helium nuclei formed therefrom either by fusion or fission of other nuclei and nucleons. The neutrons may be formed by any suitable neutron source, such as by irradiating tritium with deuterons.

Figure 3:
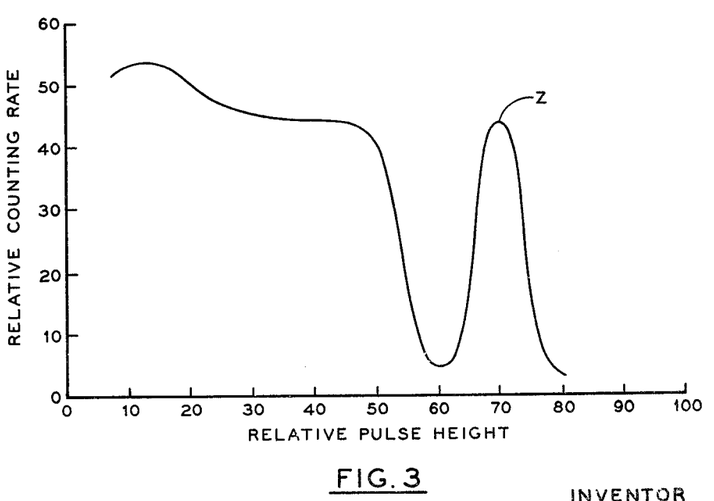
FIG. 3 is a graph of relative counting rate versus relative pulse heights recorded with a scintillation detector when only a single monoenergetic gamma ray interacts with a scintillation crystal large enough to permit substantially all of the gamma-ray energy to be absorbed in the crystal, and the energy of said gamma ray is less than about 3 m.e.v., so that the photopeak energy is emphasized.

As discussed above, the advantage of the present method of nuclear resonance fluorescence gamma ray logging is most clearly emphasized when compared to conventional nuclear spectroscopy logging. For this purpose FIGS. 4 to 7 have been included in the present specification to illustrate the advantages of nuclear resonance fluorescence. FIG. 3 is an example of monoenergetic gamma rays from a single nuclear source that have been detected in a system of highly idealized geometry and shielding means so that all other gamma rays are excluded from the detecting system. It will be noted in the plot of relative pulse height vs. relative counting rate that at 70 on the relative pulse height scale the photoelectric energy of the single monoenergetic gamma ray yields a preferred interaction with the detector. However, if the detection system were perfect, the broad band peak indicated as Z would be simply a spike near the pulse height value 70, and there would be little or no broadening to the peak. Because it is difficult, if not impossible, to achieve such ideal conditions with presently known detecting apparatus, the peak Z has a breadth that goes to a minimum near 60, and then as pulse height further decreases, the counting rate rises to a value higher than peak Z. This continuum of energies (no peaks) is known in gamma ray spectroscopy as Compton scattering; that is, the gamma ray interacts by elastic recoil with electrons in the detecting crystal or the gamma rays has lost energy by electron scattering prior to entering the detector. The broadening of peak Z is due to these same interactions.

Figure 4:
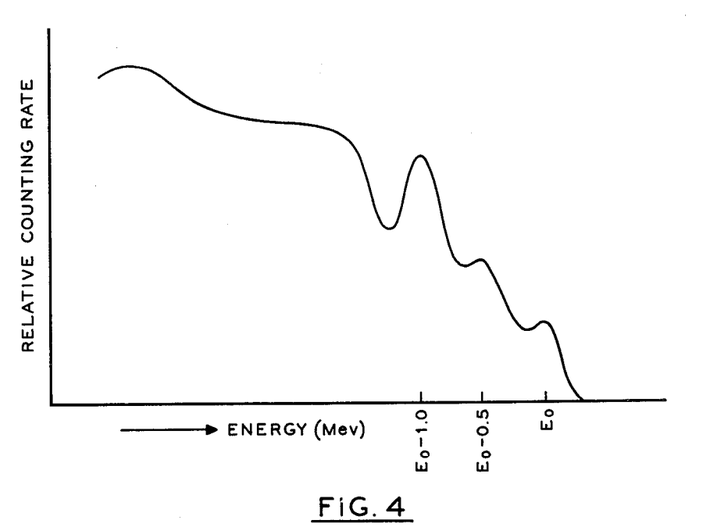
FIG. 4 is a similar diagram of relative counting rate versus energy (or pulse height), illustrating a gamma-ray spectrum that is ideally recorded when a single, monoenergetic gamma ray of greater than about 3 m.e.v. interacts with a scintillation crystal and said crystal primarily detects the pair-production peak (the full energy peak minus both annihilation quanta) in preference to both the full energy peak minus one annihilation quantum, and the full energy peak.

FIG. 4 represents a gamma ray of energy greater than about 3 m.e.v. that was recorded in a detector particularly designed to emphasize the pair-production peak, noted as $E_0-1.0$. As is well understood in the art of gamma ray spectroscopy, this energy represents the full energy of the interacting gamma ray less a pair of annihilation quanta that are generated when the gamma ray interacts with the crystal by the pair-production method. The $E_0-0.5$ peak of lesser height represents the pair-production effect in which one annihilation quantum has escaped the crystal, and the $E_0$ peak represents that interaction when both annihilation quanta have remained inside the crystal. Again the continuum of energy below the peak at $E_0-1$ is the Compton scattering of the same monoenergetic gamma ray before and after interaction with material of the crystal.

Figure 5:
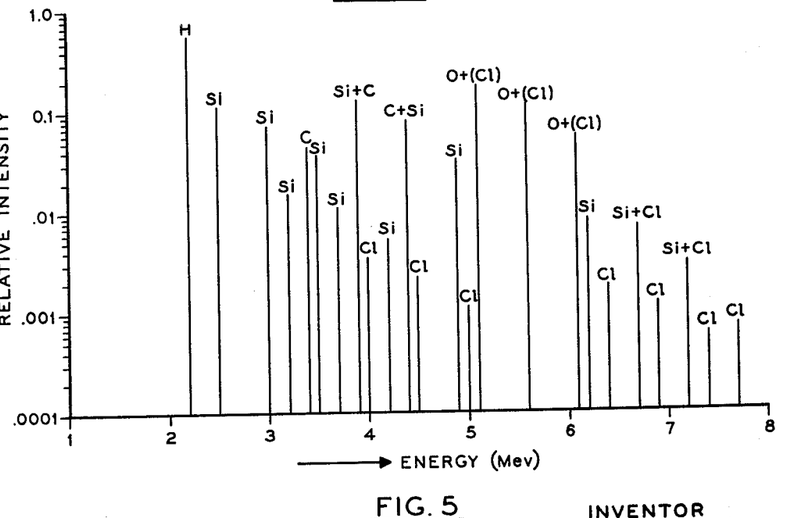
FIG. 5 is a stick diagram of relative gamma-ray energies that are generated by nuclei in a typical earth formation, sandstone, that has about 20% porosity and includes 70% oil and 30% water, the water containing about 50,000 p.p.m. sodium chloride, with said gamma rays originating by both inelastic scatter of fast neutrons and thermal-neutron capture.

It will be apparent from a consideration of the foregoing FIGS. 3 and 4, that peaks in a gamma ray spectrum recorded even when monoenergetic gamma rays are detected with a gamma ray spectrometer under most idealized conditions, do not represent a very exact method of determining relative quantity of that gamma ray. FIG. 5 is a representation of a plurality of neutron capture gamma ray energies that are developed in a relatively simple earth formation, such as sandstone, having about 20% porosity and including about 70% oil and 30% water; the salinity of the water was about 50,000 parts per million (p.p.m.) of sodium chloride dissolved therein. The relative intensity of the gamma rays and their associated pair-production peaks are indicated as sticks whose relative intensities and source nucleus is noted above each stick.

Figure 6:
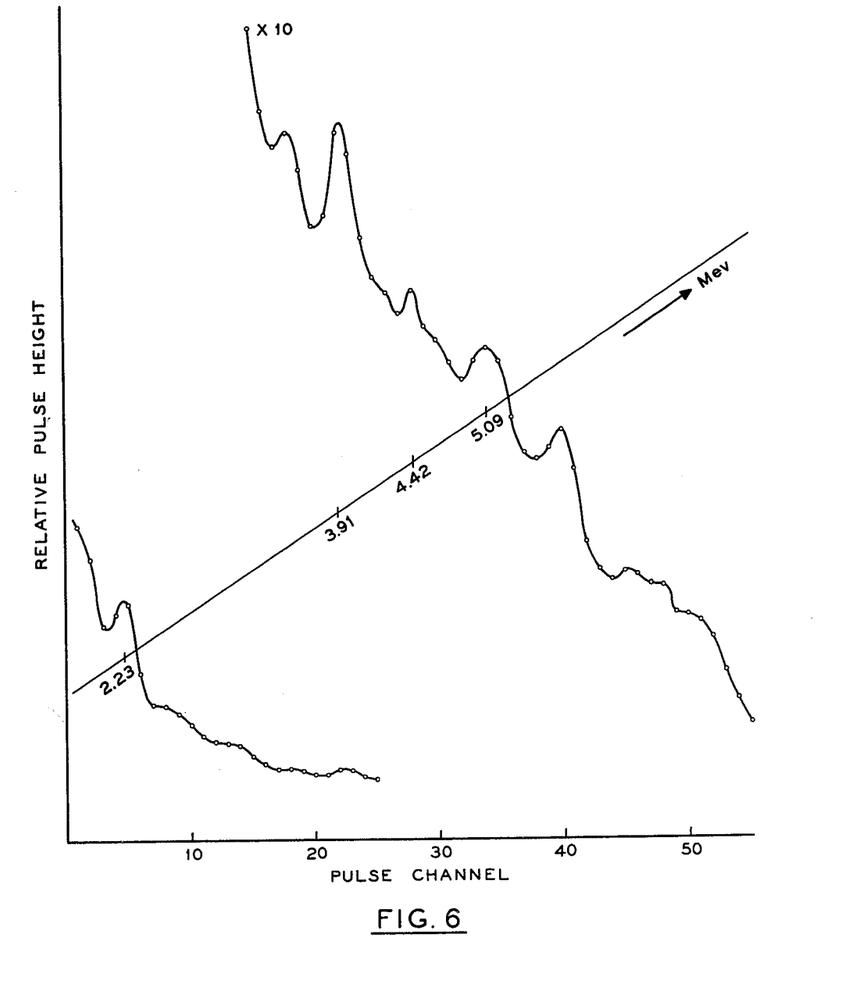
FIG. 6 illustrates the contribution of each of the monoenergetic gamma rays illustrated in FIG. 5 when their individual intensities versus energies, as in FIG. 4, are added together in a total curve.

FIG. 6 is a representation of the spread of some of the individual gamma rays illustrated in FIG. 5, and indicates the sum of such individual gamma ray pulse height distribution curves. It will be noted in the total curve, the only curve that can be recorded in a borehole, that the already broad peaks in the individual gamma ray spectra are greatly broadened, and in fact the characteristic peak, that would appear at 4.43 m.e.v. for carbon is obscured by the contribution of the silicon peak at 4.42 m.e.v.

Figure 7:
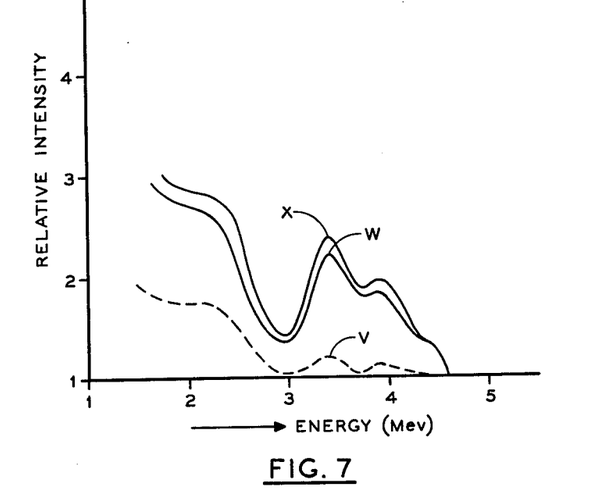

As distinguished from the foregoing, the curve of FIG. 7 indicates the relative intensity vs. energy of nuclear resonance fluorescence gamma rays from carbon-12 as they interact with the crystal and vary with the quantity of carbon-12 within the earth formation. While the peaks X, W and V are broad, as compared to the characteristic energy of these gamma rays, it is known that no other gamma rays greater than 3 m.e.v. will be present in the well bore. The entire quantity, or the integrated value, of the curve above 3 m.e.v. may be recorded as the relative quantity of carbon-12 in the earth formation. It is the integrated value of these gamma rays above 3 m.e.v. that is recorded as curve 15A in the apparatus of FIG. 1 and it is this integrated value that is recorded as curve 15A on record 15.

Various modifications of the present method may be made without departing from the present invention, wherein nuclear resonance fluorescence gamma rays are generated with sufficient kinetic energy and emitted at a desired angle to the wall of well bore to generate the characteristic gamma rays from an excited state of the desired nucleus, either carbon or oxygen. As mentioned above, one such system includes the conversion of the linear accelerator 19 from a nucleon, or heavy particle, accelerator to an electron accelerator. Such an accelerator may be used to generate electrons in a "white" spectrum (wide energy range) to yield Bremsstrahlung. Such radiation is characterized by the interaction of electrons with nuclei so that electrons are either emitted, or captured, and the resulting gamma radiation is broad-band in energy range. Such energy ranges may be selected so that the characteristic gamma rays of exactly the prescribed energy, i.e., $E-E^2/Mc^2$, are generated in sufficient number to irradiate the earth formation and any target carbon or oxygen nuclei therein.

From the foregoing it will be apparent that the present method of generating gamma rays solely from carbon (or oxygen) nuclei in an earth formation traversed by a well bore includes the required steps of positioning a target that either contains carbon-12 (or oxygen-16) nuclei, or at least nuclei that are convertible to such isotopes, as is nitrogen-15 to carbon-12 (or fluorine-19 to oxygen-16) in its first (or low order) excited state. The target is then irradiated with nucleons such as protons, neutrons, or alpha particles to interact with said convertible nuclei to transfer to said nuclei at least 4.43 m.e.v. of energy plus a known increment for the kinetic energy due to recoil between the target nuclei and the bombarding of nucleons. The increment is desirably sufficient to maximize radiation at $90° \pm 15°$ to the direction of the incident particles bombarding the accelerator target. A detector is then positioned in the well bore vertically displaced from the target and shielded from direct radiation by the incident particles and the gamma rays directly emitted with said 4.43 m.e.v. plus said increment of kinetic energy so that the nuclear resonance fluorescence gamma rays from the known and only that known nucleus return to the well bore from the earth formation after generation by the incident gamma rays from said target. Because said gamma rays will be the only ones arriving at the detector under the specified conditions, all gamma rays above about 3 m.e.v. are detected in the well bore to indicate only the relative quantity of carbon-12 within said earth formation. If oxygen-16 is to be detected, all gamma rays above about 5 m.e.v. may be detected. The relative number of such gamma rays above said energy may then be recorded in unit time as an indication of the relative content of solely carbon (or oxygen) in said formation.

While various other modifications and changes in the method will become apparent to those skilled in the art from the foregoing description of the apparatus and the modifications thereof suggested herein, all such changes falling within the scope of the appended claims are intended to be included therein.

I claim:

1. The method of generating gamma rays solely from carbon nuclei in an earth formation traversed by a well bore which comprises:
    (1) positioning in said well bore a target containing nuclei convertible to C–12 in its first excited state;
    (2) irradiating the target with nuclear particles to excite said nuclei to 4.43 m.e.v. plus an increment of kinetic energy due to recoil between the target nucleus and the bombarding particle, said increment being sufficient to maximize the radiation at 90°±15° to the axis of the well bore;
    (3) positioning a detector in said well bore vertically displaced from the target and shielded from direct irradiation therefrom;
    (4) and detecting all gamma rays above 3.0 m.e.v., said gamma rays being indicative only of carbon within said earth formation.

2. The method of generating gamma rays solely from a single species of nuclei in an earth formation traversed by a well bore which comprises:
    (1) positioning in the well bore a target containing nuclei convertible to the same said single species in the first excited state of said nucleus;
    (2) radiating the target nuclei with nucleons to excite said nuclei to the said first excited state plus an increment of kinetic energy corresponding to the recoil energy when the target nucleus is struck by the radiating particle;
    (3) controlling said increment of kinetic energy to maximize the radiation from said target nucleus to a preselected angle relative to the direction of the incident nucleon interacting with said target nucleus;
    (4) positioning a detector in the well bore vertically displaced from the target and shielded from direct irradiation therefrom;
    (5) detecting all gamma rays having an energy characteristic of said first excited state of said nuclei;
    (6) and recording the number per unit time of the last said gamma rays as an indication of only said nucleus within said earth formation.

3. The method of generating gamma rays solely from carbon nuclei in an earth formation traversed by a well bore which comprises:
    (a) positioning in the well bore a target containing carbon-12 nuclei,
    (b) linearly accelerating nucleons along the axis of said well bore to bombard the carbon-12 nuclei in said target,
    (c) said nucleons having an energy of 4.43 m.e.v. plus an increment of kinetic energy corresponding to that due to recoil between the target nucleus and the bombarding nucleon,
    (d) controlling said increment to confine the radiation from said target nucleus to an angle of from about 60° to 110° to the direction of acceleration of said nucleons to said target,
    (e) positioning a detector in the well bore vertically displaced from said target and shielded from direct irradiation thereby,
    (f) detecting all gamma rays having energies above 3.0 m.e.v., and
    (g) recording the number per unit time of the last said gamma rays as an indication of carbon only within said earth formation.

4. The method of detecting the presence of nuclei selected from the group consisting of oxygen-16 and carbon-12 in an earth formation traversed by a well bore by nuclear resonance radiation at one of the lower excited nuclear energy levels of said nuclei and without confusion by other gamma rays of similar energies, which comprises:
    (a) positioning a material containing nuclei convertible to said oxygen-16 and carbon-12 in said lower excited states within the well bore,
    (b) irradiating said material with a source of elementary nuclear particles to generate said lower excited levels of said oxygen-16 and carbon-12 in said target,
    (c) the energy of said nuclear particles bombarding said oxygen-16 and carbon-12 convertible material being sufficient to excite said nuclei to said lower levels to emit gamma rays having kinetic energy to generate nuclear resonance fluorescence in carbon-12 and oxygen-16 nuclei in said earth formation over an angle of between about 60° and 110° relative to the angle of incidence of said nuclear particles,
    (d) positioning a gamma-radiation shield adjacent said material for absorption of gamma rays emitted by said nuclei in said target,
    (e) placing a gamma-radiation detector behind said shielding material,
    (f) cyclically energizing said source of nuclear particles to selectively excite said oxygen-16 and said carbon-12 nuclei in said material at said lower excited levels, and
    (g) simultaneously recording at the earth's surface the resonance fluorescence gamma rays measured by said detector in accordance with the position of said material in said well bore as an indication of only carbon-12 and oxygen-16 in said earth formation.

5. The method in accordance with claim 4 wherein said target material comprises carbon dioxide and said source of nuclear particles includes nucleons selected from the group consisting of protons, neutrons and alpha particles for exciting said carbon and oxygen by the inelastic scattering process.

6. The method in accordance with claim 4 wherein irradiating said material includes cyclically increasing the gamma radiation output from said material from slightly above 4.43 m.e.v. to slightly above 6.13 m.e.v. in each interval, and said gamma-radiation detector is cyclically gated to transmit pulses representative of said 4.43 m.e.v. and 6.13 m.e.v. gamma rays in synchronism with each cycle of said gamma radiation, the intensity of said 4.43 m.e.v. and said 6.13 m.e.v. gamma rays representing respectively carbon-12 and oxygen-16 in said earth formation.

7. The method of detecting the presence of at least one species of nuclei, selected from the group consisting of oxygen-16 and carbon-12, alone in an earth formation traversed by a well bore by its nuclear resonance radiation at a lower excited nuclear energy level for said species and without confusion by other gamma rays of similar energies, which comprises:
    (a) positioning a target material adapted to produce a wide range of electromagnetic radiation energies within the borehole, (b) irradiating said target with a high-energy electron beam at a potential sufficient to generate Bremsstrahlung of at least 5 m.e.v., (c) detecting only the gamma rays that undergo nuclear resonance fluorescence with oxygen-16 and carbon-12 nuclei in said earth formation which includes detecting in said well bore the pair-production peaks of gamma rays having energies of about 5.13 m.e.v. and 3.43 m.e.v., respectively, and (d) recording said gamma rays in accordance with the depth of said target in said well bore.

8. The method of producing nuclear resonance fluorescence by preselected nuclei from the class consisting of carbon and oxygen lying within an earth formation traversed by a well bore, which comprises:

(a) generating within said well bore gamma rays having a total energy of $E^* + E^2/Mc^2$, wherein the $E^*$ is a lower, excited state, energy of gamma rays of the preselected nuclei and $E^2/Mc^2$ is the Doppler shift energy when one of said preselected nuclei interacts with a gamma ray of energy $E^*$, (b) irradiating said formation laterally from said well bore with said gamma rays of said total energy to create resonant fluorescent gamma rays of energy $E^*$ in said preselected nuclei present in said formation, and (c) detecting only those gamma rays returning to said well bore that represent the full, resonant fluorescent energy $E^*$ of said preselected nuclei.

References Cited in the file of this patent

UNITED STATES PATENTS

| 2,712,081 | Fearon et al. | June 28, 1955 |
| 2,965,757 | Martin et al. | Dec. 20, 1960 |

OTHER REFERENCES

Radiative Capture of Protons in Carbon from 80 to 126 KEV., by Lamb et al., from Physical Review, vol. 107, No. 2, July 15, 1957, pages 550–553.

Gamma Rays from Several Elements Bombarded by 10 and 14 MEV Protons, by Wakatsuki et al., from Journal of the Physical Society of Japan, vol. 15, No. 7, July 1960, pages 1141–1150.

Elastic and Inelastic Scattering of Protons by Oxygen in the Energy Region of 6.9 MEV to 15.6 MEV, by Kobayashi, S., from Journal of the Physical Society of Japan, vol. 15, No. 7, July 1960, pages 1164–1174.